Jan. 31, 1961 R. B. WATROUS 2,969,678
METER
Filed Dec. 13, 1956
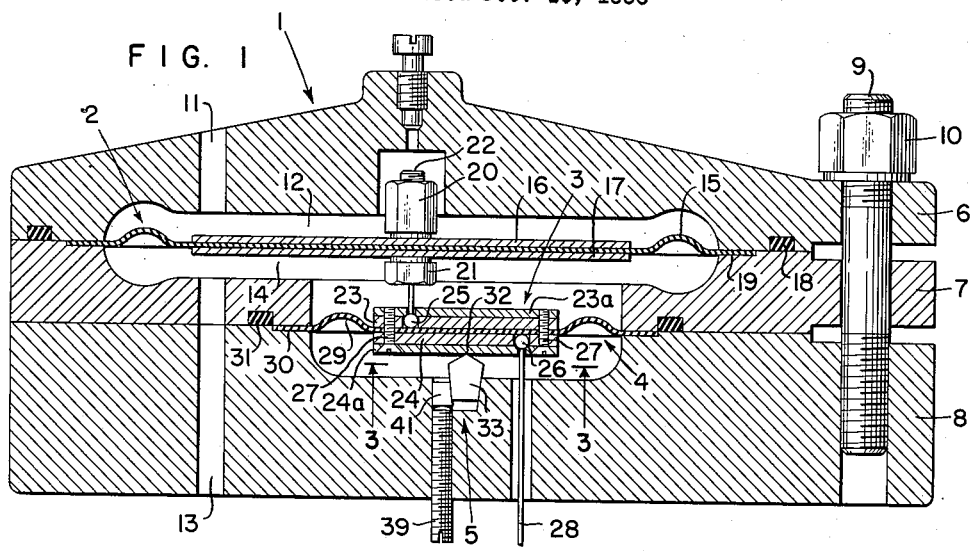
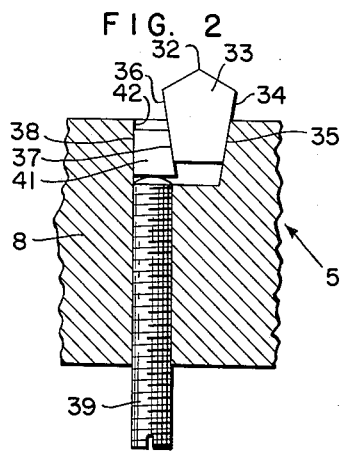
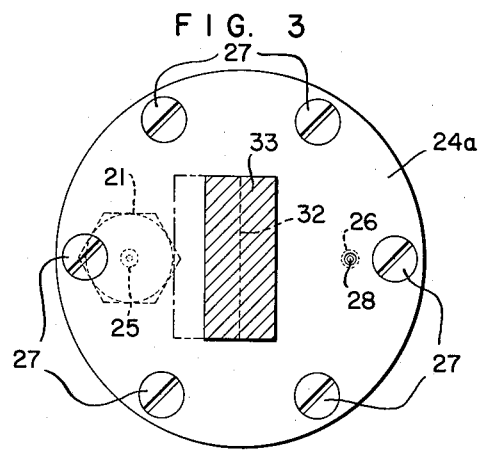
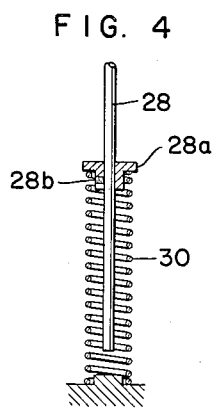
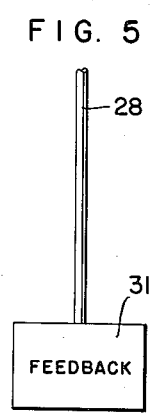
INVENTOR.
ROBERT B. WATROUS
BY
ATTORNEY.

United States Patent Office 2,969,678
Patented Jan. 31, 1961

2,969,678

METER

Robert B. Watrous, Philadelphia, Pa., assignor to Minneapolis-Honeywell Regulator Company, Minneapolis, Minn., a corporation of Delaware Filed Dec. 13, 1956, Ser. No. 628,158

4 Claims. (Cl. 73—407)

This invention relates to seals and more particularly to sealing structures for use with pressure operated instruments.

Such structures are required for sealing the static pressure applied to means for transmitting limited motion through a rigid wall. In differential pressure apparatus in which an enclosed member, such as a diaphragm, assumes a position representative of the difference between a high and a low pressure applied thereto, it is necessary to transmit a force from the enclosed member to a point outside the casing by means of a linkage or the like. The output of this linkage is used to indicate, to record, or to control the final output member of the apparatus.

It is obvious that, if both the high pressure and the low pressure be other than atmospheric, both these pressures must be sealed from the atmosphere. In other words, there is applied to the linkage in addition to the high pressure and the low pressure, whose difference is to be measured, the pressure of the atmosphere. This atmospheric pressure varies through a considerable range and introduces an error which is very material and also variable.

In the prior art, many expedients have been resorted to in order to eliminate the undesirable errors introduced because of the atmospheric pressure. These prior art devices include numerous forms of stuffing boxes, magnetic transmission devices, and flexible transmissions, which yield in response to the limited motion of the measuring element. Transmissions using stuffing boxes are always more or less subject to leakage and to friction; and any attempt to decrease one of these objectionable features is accompanied by a tendency to increase the other. Magnetic transmissions require that the wall of the containing element have a portion including a considerable area of thin, flat, non-magnetic material, in order that the transmitting magnet and its armature be brought into sufficiently close proximity that the reproduction of readings by the external mechanisms be at all positive. The flexible, metallic seals heretofore used have been of such a design that the flexing member is subjected to relatively high stresses, necessitating that a large amount of the power available from the measuring element be utilized to deform the sealing member. This also required that allowance for the elastic properties of said sealing member be incorporated in the calibration of the instrument. Since it is impractical to design a resilient element which shall combine the desired sealing properties and also have a satisfactorily uniform law of response, such instruments as have heretofore been designed to utilize the principle of the flexible seal are subject to sources of error which seriously detract from the accuracy of the measurement.

Therefore, it is an object of this invention to provide a new and improved static pressure seal in which the atmospheric or static pressure is applied in such a way as to cancel its effect on the motion-transmitting linkage.

Another object is to provide static-pressure-sealing means having a single, positive, flexible seal for the diaphragm-motion-transmitting linkage in which the effect of atmospheric or static pressure on the sealing means is offset by being applied to said sealing means on opposite sides of a pivot.

A further object of this invention is to provide means whereby the motion of a measuring element, enclosed in a space out of communication with the atmosphere, may be imparted to or reproduced by the flexing means exterior to said space and accessible for indicating, recording, or controlling in response to the measurement of the measuring element.

It is yet a further object to provide means whereby said motion may be transmitted without leakage or friction.

It is still another object to provide motion transmitting means of the class described in which a minimum resistance is offered to the motion of the measuring element.

An additional object of this invention is to provide a pivot for the motion-transmitting linkage which is not exposed to the fluid being measured nor to any fluid save that of the surrounding atmosphere.

In the drawings:

Fig. 1 is a vertical cross section of the device;

Fig. 2 is a vertical cross section on an enlarged scale showing the pivot;

Fig. 3 is a view at right angles to Figs. 1 and 2 taken from the line 3—3 looking in the direction of the arrows;

Fig. 4 is a view in detail of a modification; and

Fig. 5 is a view in detail of a second modification.

The differential-pressure-operated device of this invention comprises, in general, a case 1, a measured-variable-responsive or differential-pressure-responsive element 2, a motion-transmitting linkage 3, a static-pressure seal 4, and a pivot 5 which supports the linkage.

The case 1 is made up of the top plate 6, the intermediate ring 7, and the bottom plate 8, which are fastened together by a plurality of bolts 9 by means of nuts 10.

The diaphragm 15 divides the hollow interior of the case 1 into two pressure chambers. Through upper plate 6 extends an inlet conduit 11 which communicates with a high pressure chamber 12. Through lower plate 8 and ring 7 extends an inlet conduit 13 which communicates with a low pressure chamber 14. Conduits 11 and 13 are connected to the sources of the pressures which are to be applied to the opposite sides of the diaphragm 15. In a flow meter, for example, the high pressure on the on-coming side of a perforated disc or restriction is connected to conduit 11, while the low pressure, on the off-going side of the perforated disc or restriction, is connected to the conduit 13. The measured-variable-responsive element 2 is comprised of a diaphragm 15, which may be of metal, fabric or other flexible material. Diaphragm 15 is sealed in a recess 19 in the upper surface of ring 7 by means of a ring 18.

A linkage 3 is provided to transmit the motion of the diaphragm 15 from the interior of the case 1 to the exterior thereof. This linkage comprises an inner link 22 formed by a screw having a rounded, lower end 25. Inner link 22 is secured to diaphragm 15 by means of nuts 20 and 21 each of which bears at one end on a ring 16 or 17. Inner link 22 terminates in a ball 25 which is secured to the intermediate link formed of discs 23 and 24 by means of an upper, perforated disc 23a attached to the discs 23 and 24 by screws 27. The inner link 22 is thus pivoted, swiveled, or otherwise secured to the pivoted, intermediate link 23, 24. The outer link 28 has a rounded, upper end 26 which is secured to the pivoted, intermediate link 23, 24 by means of a perforated disc 24a which is secured to the discs 23 and 24 by means of the screws 27. The outer link 28 is therefore pivoted, swiveled, or otherwise secured to the pivoted, intermediate link 23, 24.

The static-pressure seal 4 is formed, in part, by the intermediate link 23, 24 and, in part, by a second, flexible diaphragm 29 which is sealed in a recess 30 between lower member 8 and ring 7 by means of a sealing ring 31.

As is best seen in Fig. 2, the pivot 5 for the linkage 3 and the static-pressure seal 4 is formed of a knife edge 32. Knife edge 32 forms the top of a pivot 33 which has a sloping edge 34 engaging with a sloping face 35 in lower member 8 and a second sloping face 36 engaging with a sloping face 37 on a wedge 41 which has a straight face 38 engaging with straight face 42 of lower member 8. A screw 39 extends through lower member 8 and has a rounded end 40 engaging the lower end of wedge 41.

The operation of this device is as follows. The high pressure in chamber 12 is resisted by the low pressure in chamber 14, by the static or atomspheric pressure on the outer or lower face of diaphragm 29, and by the bias of a spring 30 (Fig. 4) or of feedback means 31 (Fig. 5) applied to the output end of the linkage 3 by means of outer link 28. As is best seen in Fig. 3, the diameter about which the pivoted link 23, 24 tends to turn coincides with the knife edge 32. Therefore, the area of the intermediate link 23, 24 and of the sealing diaphragm 29 on one side of this diameter is equal to the area of the intermediate link 23, 24 and of the sealing diaphragm 29 on the other side of this diameter. Therefore, the effect of the atmospheric or static pressures on the opposite sides of this diameter cancels one another. To insure that the knife edge 32 coincides with the selected diameter of intermediate link 23, 24, pivot 5 is made adjustable. This adjustment is performed by turning screw 39 in or out. This causes rounded edge 40 to push wedge 41 so that the sloping surfaces 36 and 37 move pivot 33 along the sloping surfaces 34 and 35 and thereby adjust the knife edge 32 toward or away from the axis or center of the housing 1.

What is claimed is:

1. A differential-pressure-responsive device, including, a casing, a measured-variable-responsive element movably mounted within said casing and dividing it into two chambers, a linkage for transmitting the movement of said measured-variable-responsive element from the interior of said case to the exterior thereof and comprising, an inner link engaging said measured-variable responsive element, a pivoted link engaged by said inner link, an outer link exterior of said casing and engaging said pivoted link, a flexible static-pressure seat secured in fluid-tight engagement with the rim of said pivoted link and with said casing, and a pivot mounted on said case and engaging said pivoted link intermediate said inner link and said outer link and in such a fashion that the areas of said pivoted link and of said seal on opposite sides of said pivot are substantially equal thereby cancelling the effect of atmospheric pressure on said intermediate link.

2. A differential-pressure-operated device, including, a case, a diaphragm dividing the hollow interior of said case into two pressure chambers, an inner link secured to said diaphragm, a pivoted intermediate link comprising a pair of discs exposed on one surface to the atmosphere surrounding said device, a static-pressure seal connected to said case and to said pivoted intermediate link so as to permit a limited movement of said pivoted intermediate link, an outer link on the outside of said case, said inner link and said outer link having pivotal connection with said intermediate link, a pivot comprising a knife edge engaging said intermediate link substantially along one diameter thereof so that the areas of said intermediate link on the opposite sides of said pivot are substantially equal, and means for adjusting said pivot in a direction parallel to the faces of said disc so as to vary the axis of pivotation of said intermediate link and to thereby vary the areas on the opposite sides of said pivot and to thereby adjust the pressure of the atmosphere on said intermediate link to equalize the pressure of the atmosphere on said intermediate link.

3. A differential-pressure-responsive device, including, a case, a measured-variable-responsive element movably mounted within said case and dividing it into two chambers, a linkage for transmitting the movement of said measured-variable-responsive element from the interior of said case to the exterior thereof and comprising, an inner link engaging said measured-variable-responsive element, a pivoted intermediate link engaged by said inner link and comprising a pair of rigid discs exposed on one surface to the atmosphere surrounding said device, and an outer link, a flexible static-pressure seal secured in fluid-tight engagement with the rim of said pivoted intermediate link and with said case, and a pivot mounted on said case and engaging said pivoted intermediate link intermediate said inner link and said outer link and in such fashion that the areas of said pivoted intermediate link and of said seal on opposite sides of said pivot are substantially equal, thereby cancelling the effect of atmospheric pressure on said pivoted intermediate link.

4. A differential-pressure-responsive device, including, a case, a measured-variable-responsive element movably mounted within said case and dividing it into two chambers, a linkage for transmitting the movement of said measured-variable-responsive element from the interior of said case to the exterior thereof and comprising, an inner link engaging said measured-variable-responsive element, a pivoted intermediate link engaged by said inner link, and an outer link exterior of said case and engaging said pivoted intermediate link, a flexible static-pressure seal secured in fluid-tight engagement with the rim of said pivoted intermediate link and with said case, and a pivot comprising a knife edge engaging said pivoted intermediate link substantially along one diameter thereof so that the areas of said pivoted intermediate link on the opposite sides of said pivot are substantially equal.

References Cited in the file of this patent

UNITED STATES PATENTS

| | | |
|---|---|---|
| 1,381,139 | Smoot | June 14, 1921 |
| 1,650,060 | Bosselmann | Nov. 22, 1927 |
| 2,345,464 | De Giers | Mar. 28, 1944 |
| 2,394,284 | Howe | Feb. 5, 1946 |
| 2,539,892 | Cook | Jan. 30, 1951 |
| 2,551,212 | Berges | May 1, 1951 |

FOREIGN PATENTS

| | | |
|---|---|---|
| 161,945 | Great Britain | Apr. 12, 1921 |